(12) United States Patent
Liu et al.

(10) Patent No.: US 12,111,679 B2
(45) Date of Patent: Oct. 8, 2024

(54) CLOCK CONTROL DEVICE AND RELATED PRODUCTS

(71) Applicant: Anhui Cambricon Information Technology Co., Ltd., Hefei (CN)

(72) Inventors: Heng Liu, Hefei (CN); Song Gao, Hefei (CN); Yao Zhang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 17/620,535

(22) PCT Filed: Jan. 4, 2021

(86) PCT No.: PCT/CN2021/070148
§ 371 (c)(1),
(2) Date: Oct. 3, 2022

(87) PCT Pub. No.: WO2021/238227
PCT Pub. Date: Dec. 2, 2021

(65) Prior Publication Data
US 2023/0067178 A1 Mar. 2, 2023

(30) Foreign Application Priority Data
May 27, 2020 (CN) .......................... 202010460009.6

(51) Int. Cl.
*G06F 1/06* (2006.01)
(52) U.S. Cl.
CPC ....................................... *G06F 1/06* (2013.01)
(58) Field of Classification Search
None
See application file for complete search history.

(56) References Cited

U.S. PATENT DOCUMENTS 6,762,629 B2 * 7/2004 Tam ........................ H03L 7/081
713/300
7,050,478 B1 * 5/2006 Weekly ..................... G06F 1/08
327/143
(Continued)

FOREIGN PATENT DOCUMENTS

CN 101655521 A 2/2010
CN 110362141 A 10/2019
CN 110634513 A 12/2019

OTHER PUBLICATIONS

CN202010460009.6—First Office Action mailed on Jul. 4, 2023, 7 pages. (With Brief English Explanation).
(Continued)

*Primary Examiner* — Jeffrey S Zweizig
(74) *Attorney, Agent, or Firm* — Getech Law LLC; Jun Ye

(57) ABSTRACT

A device for clock control and related products are provided. The device includes a voltage detecting unit and a clock stretching unit. The voltage detecting unit is configured to detect a supply voltage at a target position in the processor, and output a voltage-alarm signal when the supply voltage is lower than or equal to a preset first threshold. The clock stretching unit is connected with the voltage detecting unit and configured to generate a second clock signal according to a first clock signal having a reference frequency in response to reception of the voltage-alarm signal, such that the processor uses the second clock signal to perform data processing. A frequency of the second clock signal is lower than the reference frequency. According to the device for clock control of the disclosure, when a supply voltage of a critical path is lower than a threshold, frequency reduction may be performed on the clock signal, setup time slack of the logic circuit may be increased, and a load of the processor may be reduced, thereby avoiding an error in the (Continued)

data processing result and realizing the control of the voltage droop with load.

19 Claims, 6 Drawing Sheets

(56) References Cited

U.S. PATENT DOCUMENTS

| | | | | |
|---|---|---|---|---|
| 9,778,676 | B2* | 10/2017 | Pal | G06F 1/12 |
| 10,707,877 | B1* | 7/2020 | Majumder | G06F 1/08 |
| 11,573,593 | B2* | 2/2023 | Born | G06F 1/28 |
| 11,803,404 | B2* | 10/2023 | Chen | G06N 3/045 |
| 11,847,554 | B2* | 12/2023 | Zhang | G06N 3/08 |
| 2022/0261634 | A1* | 8/2022 | Liu | G06N 3/084 |
| 2022/0405349 | A1* | 12/2022 | Zhang | G06F 17/153 |

OTHER PUBLICATIONS

PCT/CN2021/070148—International Search Report and Written Opinion mailed on Apr. 1, 2021, 13 pages.

\* cited by examiner

CLOCK CONTROL DEVICE AND RELATED PRODUCTS

CROSS REFERENCE OF RELATED APPLICATION

This is a 371 of International Application No. PCT/CN2021/070148, filed Jan. 4, 2021 which claims priority to Chinese Patent Application No. 202010460009.6, filed to the China National Intellectual Property Administration on May 27, 2020 and entitled "DEVICE FOR CLOCK CONTROL AND RELATED PRODUCTS", the disclosures of which are hereby incorporated by reference in their entirety.

TECHNICAL FIELD

This disclosure relates to the technical field of integrated circuits, and more particularly to a device for clock control and related products.

BACKGROUND

Generally, due to the limitation of a power supply network bandwidth, when a chip is powered on and load power consumption suddenly increases, a change of a load current cannot be responded in time, which may lead to a relatively large drop in a supply voltage of the chip in a short time period (usually less than 20 ns). The drop of the voltage may lead to an increase of a delay of a logic circuit in the chip. If the load current is too large to cause the voltage drop below a safe voltage of the chip, the timing of the logic circuit cannot meet the requirement of setup time, which may lead to a semi-stable state and an error in an operation result of the circuit. This problem is called voltage droop. Processing manners in related art have a relatively poor control on the voltage droop.

SUMMARY

In view of above technical problems, it is necessary to provide a device for clock control and related products.

According to an aspect of the disclosure, a device for clock control is provided, which is applied to a processor. The device includes a voltage detecting unit and a clock stretching unit.

The voltage detecting unit is configured to detect a supply voltage at a target position in the processor, and output a voltage-alarm signal when the supply voltage is lower than or equal to a preset first threshold.

The clock stretching unit is connected with the voltage detecting unit and configured to, generate a second clock signal according to a first clock signal having a reference frequency in response to reception of the voltage-alarm signal, such that the processor uses the second clock signal to perform data processing.

A frequency of the second clock signal is lower than the reference frequency.

According to another aspect of the disclosure, an artificial intelligence chip is provided. The chip includes the device for clock control described above.

According to yet another aspect of the disclosure, an electronic device is provided. The electronic device includes the artificial intelligence chip described above.

According to yet another aspect of the disclosure, a board card is provided. The board card includes a storage device, an interface device, a control device, and the artificial intelligence chip described above.

The artificial intelligence chip is respectively connected with the storage device, the control device, and the interface device. The storage device is configured to store data. The interface device is configured to realize data transmission between the artificial intelligence chip and an external device. The control device is configured to monitor a state of the artificial intelligence chip.

According to the device for clock control of the disclosure, when the supply voltage of a critical path is lower than the threshold, frequency reduction may be performed on the clock signal, setup time slack of the logic circuit may be increased, and a load of the processor may be reduced, thereby avoiding an error in the data processing result and realizing the control of voltage droop with load.

Additional features and aspects of the disclosure will become apparent from the detailed description of exemplary implementations with reference to following accompanying drawings.

BRIEF DESCRIPTION OF THE DRAWINGS

The specification and the accompanying drawings included in the specification and constituting a part of the specification cooperatively illustrate exemplary implementations, features, and aspects of the disclosure, and are used to explain the principle of the disclosure.

DETAILED DESCRIPTION

Figure 1:
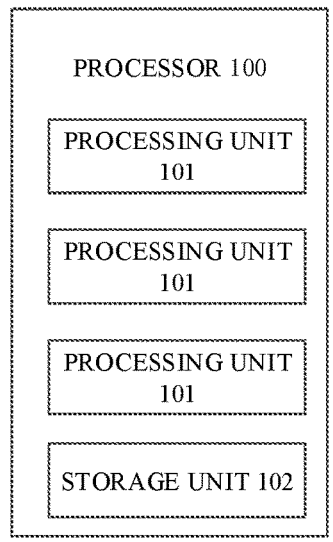
FIG. 1 is a schematic diagram illustrating a processor of a device for clock control according to an embodiment of the disclosure.

Technical solutions in embodiments of the disclosure will be described clearly and completely hereinafter with reference to accompanying drawings in the implementations of the disclosure. Apparently, the described implementations are some rather than all implementations of the disclosure. All other implementations obtained by those of ordinary skill in the art based on the implementations of the disclosure without creative efforts shall fall within the protection scope of the disclosure.

It may be understood that the terms "first", "second", "third", and the like used in the claims, the specification, and the accompanying drawings of the disclosure are used to distinguish different objects rather than describe a particular order. Terms "including/comprising" and "containing" used in the specification and the claims are intended to indicate existence of described features, integers, steps, operations, elements, and/or components, but do not exclude the existence or addition of one or more other features, integers, steps, operations, elements, and components, and/or collections thereof.

It is to be noted that the terms used in the specification of the disclosure are merely for the purpose of describing specific implementations rather than limiting the disclosure. As used in the specification and the claims of the disclosure, unless the context clearly indicates other circumstances, singular forms "a", "an", and "the" are intended to include plural forms. It may be further understood that the term "and/or" used in the specification and claims of the disclosure refers to any combination of one or more of associated items listed and all possible combinations, and includes these combinations.

As used in this specification and the claims, the term "if" may be understood as "when", "once", "in response to determining", or "in response to detecting" according to the context. Similarly, the expression "if it is determined that" or "if [described condition or event] is detected" may be understood as "once it is determined", "in response to determining", "once [described condition or event] is detected" or "in response to [condition or event described] being detected" according to the context.

A device for clock control according to implementations of the disclosure may be applied to a processor. The processor may be a general-purpose processor, such as a central processing unit (CPU), or an artificial intelligence processing unit (IPU) for executing an artificial intelligence operation(s). The artificial intelligence operations may include machine learning operations, neuromorphic operations, and so on. The machine learning operations include neural network operations, k-means operations, support vector machine operations, and so on. The IPU may, for example, include one or a combination of a graphics processing unit (GPU), a neural-network processing unit (NPU), a digital signal processing unit (DSP), a field-programmable gate array (FPGA), and an application specific integrated circuit (ASIC) chip. There is no restriction on specific types of the processor in the disclosure.

In a possible embodiment, the processor involved in the disclosure may include a plurality of processing units. Each processing unit may separately execute various tasks assigned to it, such as a convolution operation task, a pooling task, a fully connected task, or the like. There is no restriction on the processing unit and the tasks executed by the processing unit in the disclosure.

FIG. 1 is a schematic diagram illustrating a processor of a device for clock control according to an embodiment of the disclosure. As illustrated in FIG. 1, a processor 100 includes a plurality of processing units 101 and a storage unit 102. The plurality of processing units 101 are configured to execute instruction sequences. The storage unit 102 is configured to store data, which may include a random access memory (RAM) and a register file.

Figure 2:
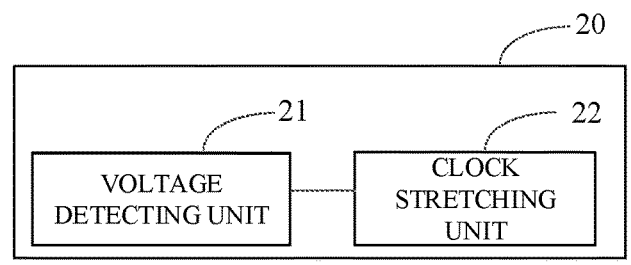
FIG. 2 is a structural block diagram illustrating a device for clock control according to an embodiment of the disclosure.

FIG. 2 is a structural block diagram illustrating a device for clock control according to an embodiment of the disclosure. As illustrated in FIG. 2, a device 20 includes a voltage detecting unit 21 and a clock stretching unit 22.

The voltage detecting unit 21 is configured to detect a supply voltage at a target position in the processor, and output a voltage-alarm signal when the supply voltage is lower than or equal to a preset first threshold.

The clock stretching unit 22 is connected with the voltage detecting unit 21 and configured to generate a second clock signal according to a first clock signal having a reference frequency in response to reception of the voltage-alarm signal, such that the processor uses the second clock signal to perform data processing.

A frequency of the second clock signal is lower than the reference frequency.

In some examples, a position of a critical path in the processor may be determined as a target position, and the supply voltage at the target position may be detected by the voltage detecting unit 21. If the supply voltage is lower than or equal to a preset first threshold, in other words, the supply voltage is lower than a preset low-voltage threshold, the voltage detecting unit 21 may generate and output an alarm signal.

In a possible embodiment, when the clock stretching unit 22 receives the alarm signal output from the voltage detecting unit 21, the clock stretching unit 22 may perform frequency reduction on the first clock signal having the reference frequency, and generate and output the second clock signal after the frequency reduction, therefore, the processor may perform data processing with the second clock signal.

In this way, when the supply voltage of the critical path is lower than the threshold, the frequency reduction may be performed on the clock signal, setup time slack of the logic circuit may be increased, and a load of the processor may be reduced, thereby avoiding an error in a data processing result and realizing the control of the voltage droop with load.

In a possible embodiment, the voltage detecting unit 21 may include a first detecting unit for implementing critical path monitor (CPM).

Figure 3:
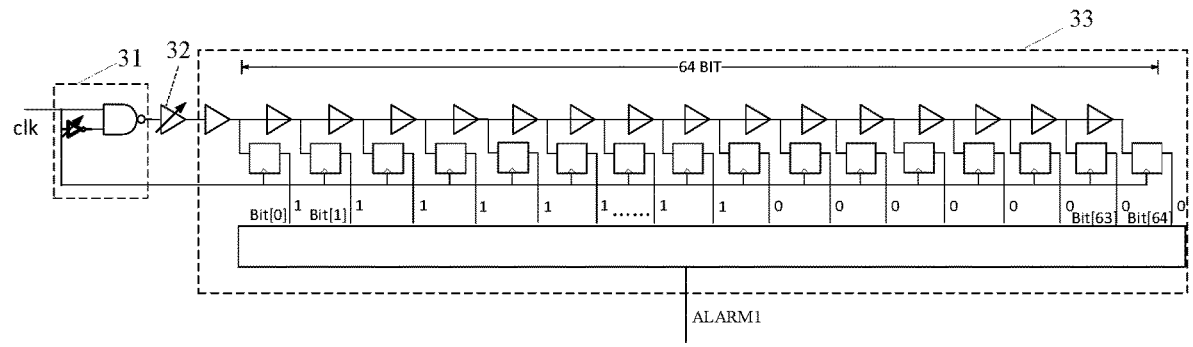
FIG. 3 is a schematic circuit diagram illustrating a first detecting unit according to an embodiment of the disclosure.

FIG. 3 is a schematic circuit diagram illustrating a first detecting unit according to an embodiment of the disclosure. As illustrated in FIG. 3, the first detecting unit may include a pulse generation circuit 31, a delay circuit 32, and a voltage detecting and processing circuit 33.

The pulse generation circuit 31 may be configured to receive an input of a fifth clock signal and output a pulse signal.

The delay circuit 32 may be connected with the pulse generation circuit and configured to receive an input of the pulse signal and then output a delayed pulse signal, where a delay between the delayed pulse signal and the pulse signal is negatively correlated with the supply voltage at the target position.

The voltage detecting and processing circuit 33 may be connected with the delay circuit and configured to determine the supply voltage at the target position according to the delayed pulse signal and the fifth clock signal, and output a first voltage-alarm signal when the supply voltage is lower than or equal to the first threshold.

In some examples, the pulse generation circuit 31 may include a serially connected multi-stage inverter and a NAND gate for example. The fifth clock signal (clk) is directly input to one input terminal of the NAND gate and then input to the other input terminal of the NAND gate after passing through the multi-stage inverter. The pulse generation circuit 31 generates the pulse signal for measurement in a first cycle of the input fifth clock signal. A pulse width of the pulse signal may be adjusted according to actual conditions, which is not limited in the disclosure. A frequency of the fifth clock signal may be the same as or different from that of the first clock signal. The disclosure is not limited thereto.

In a possible embodiment, the delay circuit (e.g., a tunable replica circuit (TRC)) 32 is connected with the pulse generation circuit 31, and may include, for example, a serially connected multi-stage inverter. A corresponding propagation delay may be generated after the input pulse signal passes through the delay circuit 32, and then the delayed pulse signal may be output. The delay between the delayed pulse signal and the pulse signal is negatively correlated with the supply voltage at the target position. In other words, the delay may increase with the decrease of the supply voltage.

Figure 4:
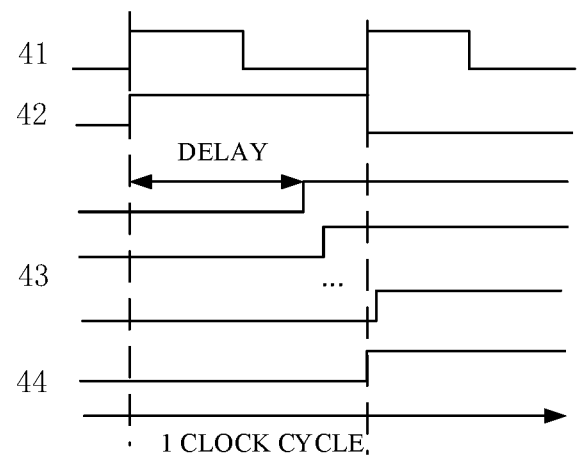
FIG. 4 is a schematic diagram illustrating a pulse signal of a device for clock control according to an embodiment of the disclosure.

FIG. 4 is a schematic diagram illustrating a pulse signal of a device for clock control according to an embodiment of the disclosure. As illustrated in FIG. 4, in a first cycle of a clock signal (clk) 41, the pulse generation circuit generates a pulse signal (e.g., Detect Pulse) 42. A pulse width of the pulse signal 42 may be, for example, equal to the clock cycle of the clock signal 41. After the pulse signal 42 passes through the delay circuit, a delayed pulse signal (e.g., Delayed pulse in TRC) 43 may be output. As illustrated in FIG. 4, the delay of the pulse signal 43 increases with the decrease of the supply voltage. A reference delay (Detect Reference) 44 may be set in advance, for example, the reference delay may be one clock cycle. If the delay of the pulse signal 43 is less than or equal to the reference delay 44, it may be considered that the supply voltage is within a reasonable range. On the contrary, if the delay of the pulse signal 43 is greater than the reference delay 44, it may be considered that the supply voltage is abnormal (i.e., below the low-voltage threshold), therefore, frequency reduction is required.

In a possible embodiment, the voltage detecting and processing circuit 33 may perform time-to-digital conversion (TDC) on the delayed pulse signal, and process the converted signal. As illustrated in FIG. 3, the voltage detecting and processing circuit 33 includes a multi-stage delayer (for example, an even number of inverters), a multi-stage register, and a comparison circuit. After the delayed pulse signal and the fifth clock signal are input, a digital signal corresponding to the delay may be generated, such as, a 64-bit signal of Bit[0], Bit[1], Bit[63], and Bit[64] in FIG. 3. According to the digital signal, a voltage value corresponding to the delay may be determined, and the voltage value corresponds to the supply voltage at the target position. A corresponding relationship between digital signals, delays, and supply voltages may be determined in advance according to experimental measurement or the like. There is no restriction on manners in which the corresponding relationship is determined in the disclosure.

In a possible embodiment, when the voltage decreases, the propagation delay of the pulse signal after passing through the adjustable delay circuit increases, and the number of bits with high-level in an output value of a time-to-digital convertor reduces. In other words, it is determined that the voltage value corresponding to the delay decreases. If the supply voltage corresponding to the voltage value is lower than or equal to the preset first threshold (e.g., the low-voltage threshold vth_low), the first voltage-alarm signal (ALARM1) may be output, to trigger the clock stretching circuit to perform the frequency reduction. The digital signal output from the multi-stage register may be directly compared with a preset threshold signal (e.g., the low-voltage threshold) through the comparison circuit, to output a comparison result. Whether or not to output the first voltage-alarm signal is determined according to a comparison result. There is no restriction on specific implementations of the comparison circuit in the disclosure.

In this way, the detection of the supply voltage may be achieved, and the alarm signal may be output in the present cycle when the voltage droop with load is detected, so as to realize the control of the voltage droop with load and improve the response speed of the device. Compared with the related art, a circuit structure is simplified and a circuit area is reduced.

In a possible embodiment, the voltage detecting and processing circuit 33 may be further configured to output, during output of the first voltage-alarm signal, a first voltage-normal signal when the supply voltage is higher than or equal to a preset second threshold and a duration for which the supply voltage is higher than or equal to the second threshold reaches a preset first duration. The second threshold is greater than the first threshold.

For example, after the clock stretching circuit performs the frequency reduction, a data processing performance of the processor may be reduced. Therefore, when the supply voltage rises to a set high-voltage threshold and keeps rising for a time period, a frequency of an output clock may be restored. The frequency of the output clock is the reference frequency.

During the output of the first voltage-alarm signal, the voltage detecting and processing circuit 33 may continuously obtain the voltage value corresponding to the delay. If the supply voltage corresponding to the voltage value is higher than or equal to the preset second threshold, and the duration for which the supply voltage is higher than or equal to the second threshold reaches the preset first duration, the first voltage-normal signal may be output, such that the clock stretching circuit may restore the frequency of the output clock. The frequency of the output clock is the reference frequency. The second threshold is the set high-voltage threshold (vth_high), which is greater than the first threshold (low-voltage threshold vth_low). The first duration may be preset a plurality of clock cycles for example. There is no restriction on values of the second threshold and the first duration in the disclosure.

In a possible embodiment, the digital signal output from the multi-stage register may be directly compared with the preset threshold signal (e.g., high-voltage threshold) through the comparison circuit, and then a comparison result is output. Whether or not to output the first voltage-normal signal is determined according to the comparison result and the number of qualified comparison results. There is no restriction on specific implementations of the comparison circuit in the disclosure.

Figure 5:
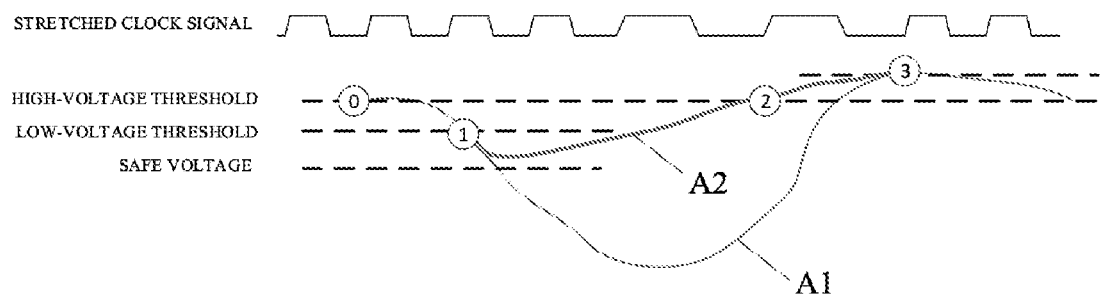
FIG. 5 is a schematic diagram illustrating an adjustment process of a supply voltage of a device for clock control according to an embodiment of the disclosure.

FIG. 5 is a schematic diagram illustrating an adjustment process of a supply voltage of a device for clock control according to an embodiment of the disclosure. As illustrated in FIG. 5, the high-voltage threshold (vth_high)>the low-voltage threshold (vth_low)>a safe voltage (safe voltage). Without clock control, as indicated by a curve A1 in FIG. 5, supply voltage VDD continuously decreases with the increase of the load, and after decreasing from the high-voltage threshold (a position 0 in FIG. 5) to the low-voltage threshold (a position 1 in FIG. 5), the supply voltage VDD continues to decrease until the supply voltage VDD is lower than a safe voltage, which may lead to the error in the data processing result.

In the case of adopting the clock control, as indicated by a curve A2 in FIG. 5, when the supply voltage VDD reaches the low-voltage threshold (time point 1 in FIG. 5) from the high-voltage threshold (time point 0 in FIG. 5), the voltage detecting and processing circuit outputs the voltage-alarm signal, and the clock stretching unit performs the frequency reduction after receiving the voltage-alarm signal, to output a stretched clock signal (stretched clock), such that the supply voltage VDD rises before reaching the safe voltage, thereby avoiding the error in the data processing result.

In a possible embodiment, when the supply voltage VDD rises above the high-voltage threshold (time point 2 in FIG. 5), and keeps rising for N clock cycles (e.g., the first duration) until the supply voltage VDD arrives time point 3 in FIG. 5, the voltage detecting and processing circuit outputs a voltage-normal signal, such that the clock stretching circuit may restore the frequency of the output clock. The frequency of the output clock is the reference frequency.

According to the voltage detecting and processing circuit of the embodiments of the disclosure, the bistable line control is adopted. In other words, the alarm is triggered at time point 1 when the supply voltage is lower than the low threshold, and when the supply voltage rises above the low threshold and below the high threshold, the alarm is not canceled. The alarm may be canceled only after the supply voltage rises above the high threshold at time point 2 and remains rising for the N clock cycles until time point 3 is reached. In this way, influence of small fluctuation of the supply voltage on the alarm signal may be eliminated, which may avoid oscillation of the alarm signal, so as to avoid oscillation of the clock stretching circuit between the frequency reduction and frequency increase, such that a relatively great fluctuation of the supply voltage may be avoided.

In a possible embodiment, the voltage detecting unit 21 may include a second detecting unit. The second detecting unit may include a ring oscillation circuit and a processing circuit.

The ring oscillation circuit may be configured to output a fourth clock signal according to the supply voltage at the target position.

The processing circuit may be connected with the ring oscillation circuit and configured to determine a count value within a preset second duration according to the fourth clock signal and output a second voltage-alarm signal when the count value is less than or equal to a preset first count threshold.

Figure 6:
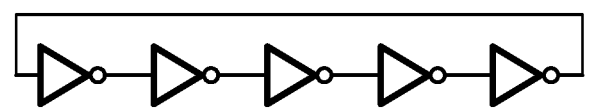
FIG. 6 is a schematic diagram illustrating a ring oscillation circuit of a device for clock control according to an embodiment of the disclosure.

In some examples, the voltage detecting unit 21 may perform voltage detection by adopting the ring oscillation circuit (Ring oscillator). FIG. 6 is a schematic diagram illustrating the ring oscillation circuit of the device for clock control according to an embodiment of the disclosure. As illustrated in FIG. 6, the ring oscillating circuit may be formed by connecting an odd number of inverters end to end. As long as the processor is powered on, the ring oscillation circuit may automatically oscillate to generate the fourth clock signal. An oscillation frequency of the ring oscillation circuit is associated with a voltage, temperature, and technology. Therefore, the ring oscillation circuit may be used as a detector for an operating state of the processor. If the chip technology of the processor is determined and the operating temperature of the processor is substantially unchanged, the oscillation frequency of the ring oscillation circuit may increase with the increase of the voltage and decrease with the decrease of the voltage.

In a possible embodiment, the ring oscillation circuit may output the fourth clock signal according to the supply voltage at the target position (i.e., the critical path of the processor). The processing circuit may be connected with the ring oscillation circuit, and configured to determine the count value within the preset second duration according to the fourth clock signal. The processing circuit may include a counter (not illustrated), and the fourth clock signal may be used as an input of the counter. The count value of the counter may reflect the level of the supply voltage within the preset second duration (such as 1000 ns).

In a possible embodiment, the processing circuit may compare the count value with the preset first count threshold. If the count value is less than or equal to the preset first count threshold, it may be considered that the supply voltage is abnormal (i.e., lower than the low-voltage threshold), and then the processing circuit may output the second voltage-alarm signal to trigger the clock stretching circuit to perform the frequency reduction. The first count threshold may be a preset count value corresponding to the low-voltage threshold. There is no restriction on values of the first count threshold in the disclosure.

In this way, the detection of the supply voltage may be achieved, so as to realize the control of the voltage droop with load.

In a possible embodiment, the processing circuit may be further configured to output, during output of the second voltage-alarm signal, a second voltage-normal signal when the count value is greater than or equal to a preset second count threshold and the number of times that the count value is greater than or equal to the second count threshold reaches a preset number of times. The second count threshold is greater than the first count threshold.

In some examples, after the clock stretching circuit performs the frequency reduction, the data processing performance of the processor may be reduced. Therefore, when the supply voltage rises to the set high-voltage threshold, the frequency of the output clock may be restored to the reference frequency.

During the output of the second voltage-alarm signal, the processing circuit may continuously obtain count values of a plurality of second durations. If the count value is greater than or equal to the preset second count threshold and the number of times of the count value is greater than or equal to the second count threshold reaches the preset number of times, the second voltage-normal signal may be output, such that the clock stretching circuit may restore the frequency of the output clock to the reference frequency. The second count threshold may be a preset count value corresponding to the high-voltage threshold, which is greater than the first count threshold. The preset number of times may be, for example, 5-10 times. There is no restriction on values of the second count threshold and the preset number of times in the disclosure.

By adopting the bistable line control, the influence of the small fluctuation of the supply voltage on the alarm signal may be filtered out, which may avoid oscillation of the alarm signal, so as to avoid oscillation of the clock stretching circuit between the frequency reduction and the frequency increase, such that greater fluctuation of the supply voltage may be avoided.

Figure 7:
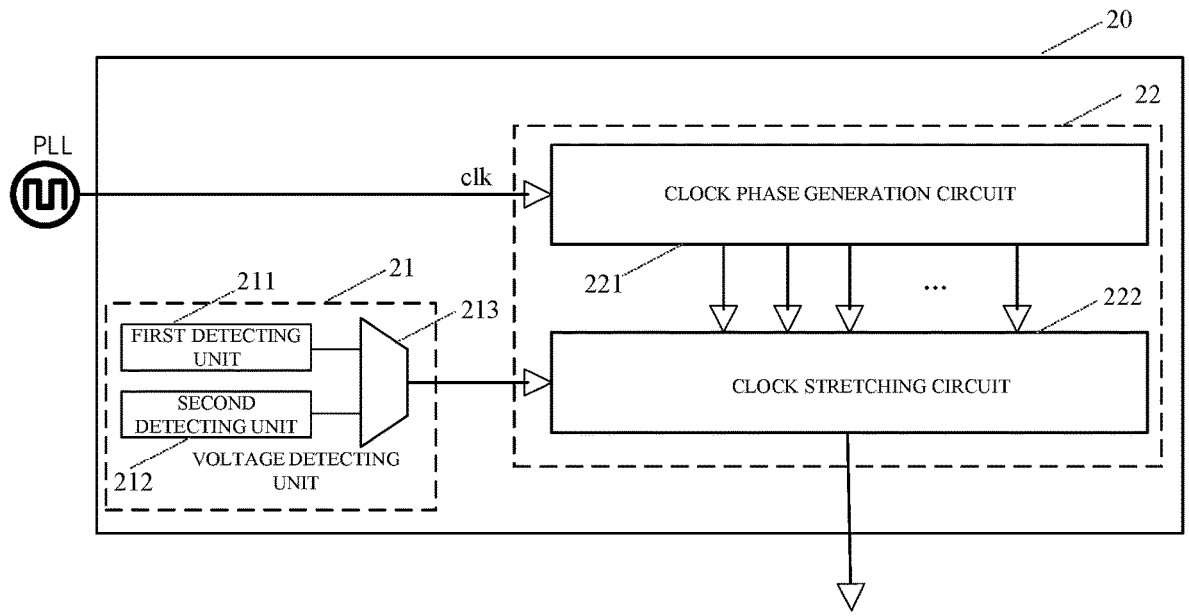
FIG. 7 is a structural block diagram illustrating a device for clock control according to an embodiment of the disclosure.

FIG. 7 is a structural block diagram illustrating a device for clock control according to an embodiment of the disclosure. As illustrated in FIG. 7, the voltage detecting unit 21 of the device 20 may include a first detecting unit 211, a second detecting unit 212, and a first selecting unit 213. The first selecting unit 213 is connected with the first detecting unit 211, the second detecting unit 212, and the clock stretching unit 22, respectively.

The first selecting unit 213 may be configured to output an output signal of the first detecting unit or an output signal of the second detecting unit to the clock stretching unit.

In some examples, the first selecting unit 213 may include a selector, to select the output signal of the first detecting unit 211 or the output signal of the second detecting unit 212 according to an enabled signal, so as to control the clock stretching unit through the first detecting unit or the second detecting unit. The first detecting unit 211 and the second detecting unit 212 may work separately without affecting each other.

When a quick response to the voltage droop with load is required, the clock stretching unit may be controlled by the first detecting unit. On the contrary, the clock stretching unit may be controlled by the second detecting unit. Those skilled in the art may set the selected detecting unit according to the actual situation, which is not limited in the disclosure. In this way, the flexibility of the clock stretching control may be improved.

In a possible embodiment, the voltage detecting unit may include a first detecting unit, a second detecting unit, and a second selecting unit (not illustrated). The second selecting unit is connected with the first detecting unit, the second detecting unit, and the clock stretching unit, respectively.

The second selecting unit may be configured to: output the voltage-alarm signal to the clock stretching unit when the first detecting unit outputs the first voltage-alarm signal and/or the second detecting unit outputs the second voltage-alarm signal; and output a voltage-normal signal to the clock stretching unit when the first detecting unit outputs a first voltage-normal signal and the second detecting unit outputs the second voltage-normal signal.

In some examples, the second selecting unit may include, for example, an OR gate. Both the first voltage-alarm signal of the first detecting unit and the second voltage-alarm signal of the second detecting unit may be regarded as logic 1, and both the first voltage-normal signal of the first detecting unit and the second voltage-normal signal of the second detecting unit may be regarded as logic 0.

When the first detecting unit outputs the first voltage-alarm signal (logic 1) and/or the second detecting unit outputs the second voltage-alarm signal (logic 1), the second selecting unit outputs the voltage-alarm signal (logic 1) to the clock stretching unit, such that the clock stretching unit may perform the frequency reduction. When the first detecting unit outputs the first voltage-normal signal (logic 0) and the second detecting unit outputs the second voltage-normal signal (logic 0), the second selecting unit outputs the voltage-normal signal (logic 0) to the clock stretching unit, such that the clock stretching unit may restore the frequency of the output clock to the reference frequency.

In other words, as long as one of the first voltage-alarm signal and the second voltage-alarm signal is pulled up, the clock stretching circuit may undergo the frequency reduction. The clock stretching circuit may restore the original frequency when both the first voltage-alarm signal and the second voltage-alarm signal are cancelled.

In this way, by combining the quick response of the first detecting unit (CPM) to the voltage droop with load with the insensitivity of the second detecting unit (i.e., the ring oscillation circuit) to the voltage noise, it is possible to ensure that the system may quickly respond to voltage droop events. In addition, after the frequency reduction is occurred, the frequency may not be restored before the voltage droop event ends due to the voltage noise, which further improves the reliability of the clock stretching control.

In a possible embodiment, as illustrated in FIG. 7, the clock stretching unit 22 may include a clock phase generation circuit 221 and a clock stretching circuit 222.

The clock phase generation circuit 221 may be configured to output a plurality of phase clock signals according to the first clock signal.

The clock stretching circuit 222 may be connected with the clock phase generation circuit and configured to generate the second clock signal through an integrate clock gating (ICG) according to the plurality of phase clock signals in response to reception of the voltage-alarm signal.

In some examples, the clock phase generation circuit 221 may be, for example, a delay lock loop (DLL) circuit, which may be configured to input a first clock signal from a phase lock loop (PLL) and then output a plurality of phase clock signals, for example, output eight phase clock signals whose phases are respectively 0, 45, 90, 135, 180, 225, 270, and 315 degrees. A phase difference between adjacent phase clocks is 45 degrees.

Figure 8:
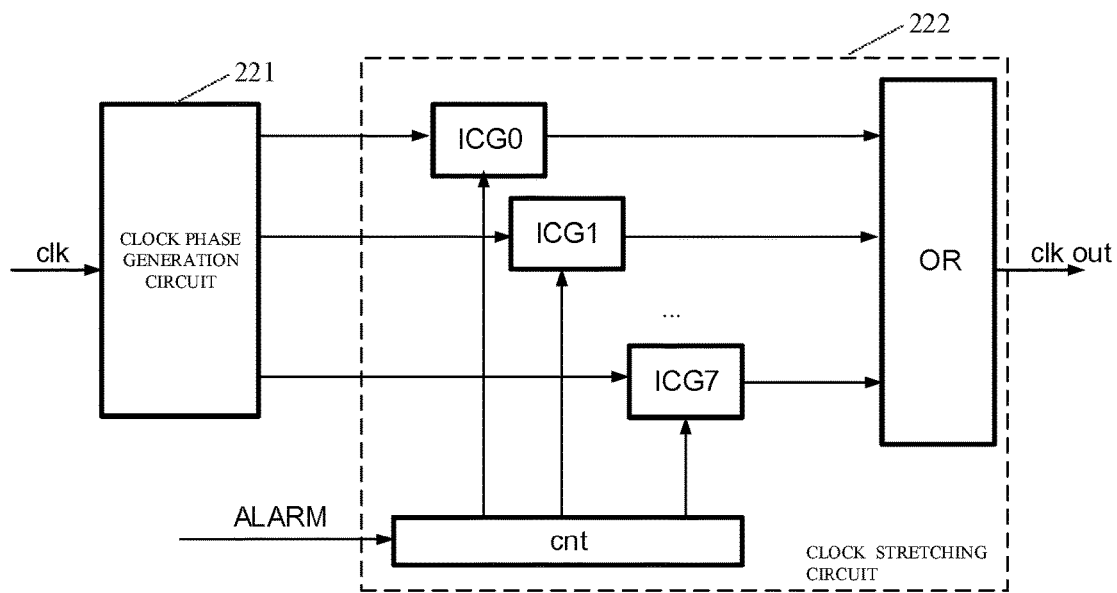
FIG. 8 is a schematic circuit diagram illustrating a clock stretching unit according to an embodiment of the disclosure.

FIG. 8 is a schematic circuit diagram illustrating a clock stretching unit according to an embodiment of the disclosure. As illustrated in FIG. 8, the clock phase generation circuit 221 may generate eight phase clocks, which are input to 8 ICG circuits (ICG0, ICG1, . . . , ICG7), respectively.

When the clock stretching circuit 222 receives the voltage-alarm signal (ALARM) from the voltage detecting unit 21, the counter (cnt) may start counting, and a digital encoding of an enabled signal icg_en [7: 0] may be generated and input into the ICG circuits (ICG0, ICG1, . . . , ICG7), respectively, to cause the ICG circuits to be activated in different time periods, and output one of a plurality of phase clock signals. After the plurality of phase clock signals pass through the OR gate, the second clock signal (clk_out) may be generated. Any circuit structure in the related art may be adopted to form the ICG, which is not limited in the disclosure.

In a possible embodiment, different phase clocks may be combined at an output terminal to obtain different proportions of frequency-reducing clocks. If there are eight phase clock signals, two frequency-reducing clocks (i.e., second clock signals) which are respectively 8/9 or 4/5 of the reference frequency may be output for example. A person skilled in the art may set frequency-reducing proportions of the frequency-reducing clock according to the actual situation, which is not limited in the disclosure.

Figure 9A:
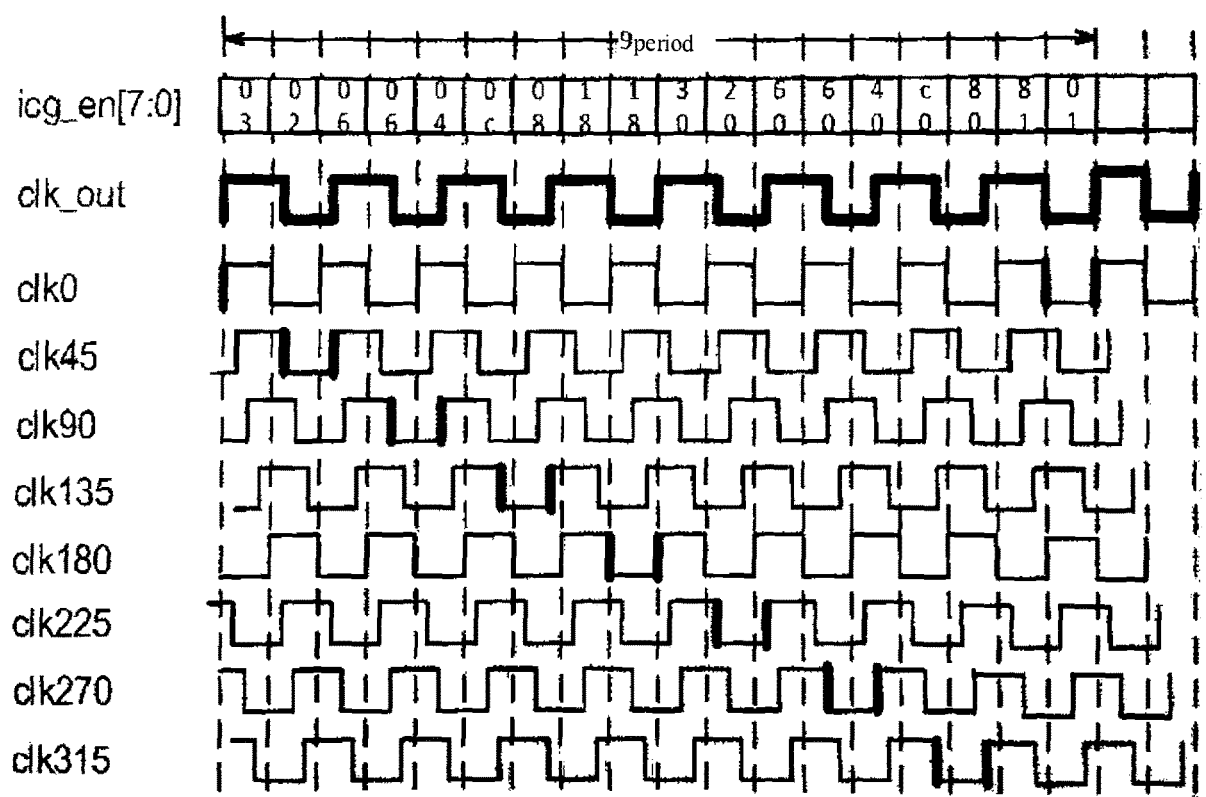
FIGS. 9a and 9b are schematic diagrams illustrating second clock signals according to an embodiment of the disclosure.
Figure 9B:
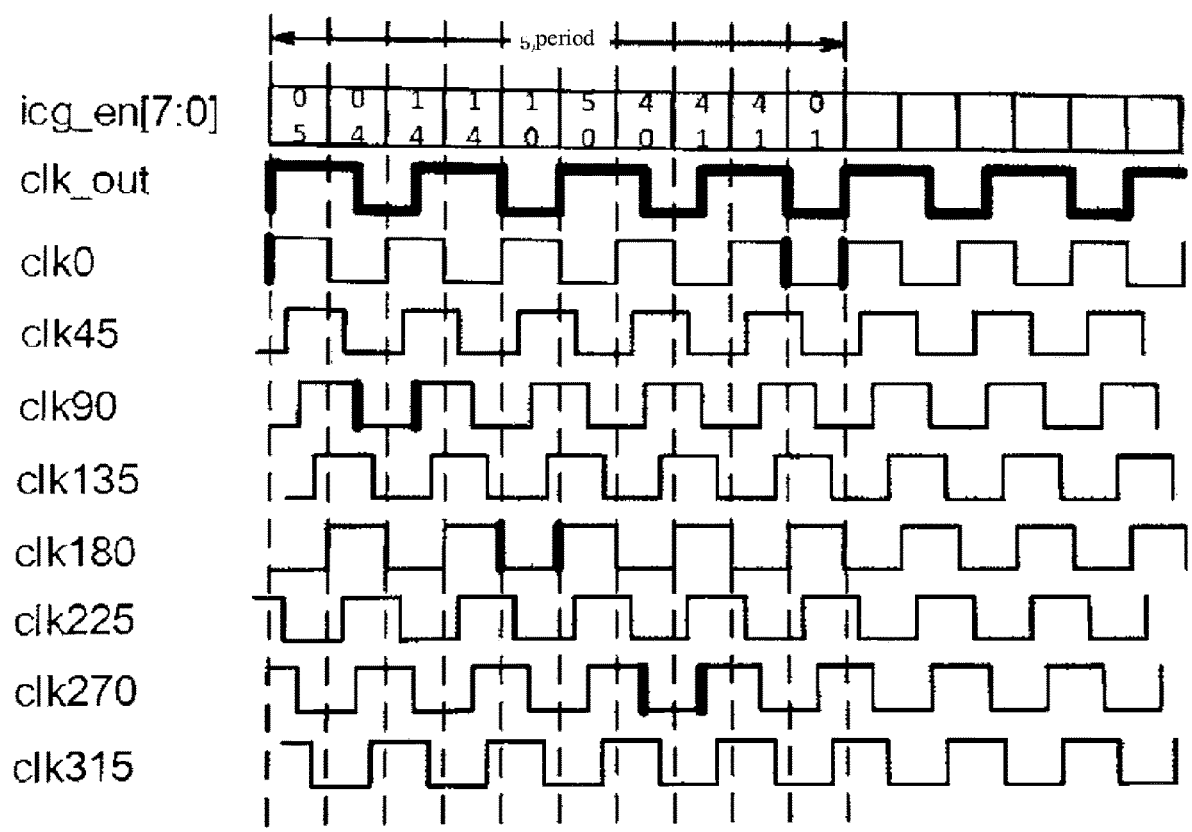

FIGS. 9a and 9b are schematic diagrams illustrating second clock signals according to an embodiment of the disclosure. FIG. 9a is a schematic diagram illustrating generation of a second clock signal a frequency of which is 8/9 of the reference frequency. FIG. 9b is a schematic diagram illustrating generation of a second clock signal a frequency of which is 4/5 of the reference frequency.

As illustrated in FIGS. 9a and 9b, according to the encoding of the enabled signal icg_en [7:0] of the 8 ICG circuits (ICG0, ICG1, . . . , ICG7), the ICG circuits may be controlled to be activated in different time periods (for example, a bolded part of each phase clock signal), such that the eight phase clock signals (clk0 clk45, clk90, clk135, clk180, clk225, clk270, and clk315) may be output in different time periods. After the eight phase clock signals pass through the OR gate, the second clock signal (clk_out) may be output, thereby completing the frequency reduction of the clock. For the 8/9 of the reference frequency in FIG. 9a, 9 clock cycles of the first clock signal are required and then a second clock signal of 8 cycles is generated. For the 4/5 of the reference frequency in FIG. 9b, 5 clock cycles of the first clock signal are required and then a second clock signal of 4 cycles is generated.

In this way, the clock stretching may be achieved, the clock frequency may be reduced, and therefore the load of the processor may be reduced, such that the voltage droop with load may be controlled. In addition, the clock stretching is realized by adopting the synchronous circuit composed of clock gating, which may improve the stability of the stretched clock signal and avoid burr.

In a possible embodiment, the clock stretching unit 22 may be further configured to generate a third clock signal according to the first clock signal or the plurality of phase clock signals in response to reception of a voltage-normal signal, such that the processor uses the third clock signal to perform data processing. A frequency of the third clock signal is equal to the reference frequency.

For example, if the clock stretching unit 22 receives the voltage-normal signal from the voltage detecting unit 21, the clock stretching unit 22 may stop reducing the clock frequency, and generate and output the third clock signal. The frequency of the third clock signal is equal to the reference frequency. A phase of the third clock signal may be the same as or different from that of the first clock signal, which is not limited in the disclosure.

In a possible embodiment, when the clock stretching circuit 222 receives a voltage-normal signal, the clock stretching circuit 222 may directly output the first clock signal as the third clock signal, or may perform the phase-adjusting on first clock signal and then output it as the third clock signal, or select any one of the plurality of phase clock signals and then output the any one of the plurality of phase clock signals as the third clock signal. There is no restriction on manners in which the third clock signal is generated in the disclosure.

According to the device for clock control of the embodiments of the disclosure, when the supply voltage of the critical path is lower than the threshold, the frequency reduction may be performed on the clock signal of the processor, the set-up time slack of the logic circuit may be increased, and the load of the processor may be reduced, thereby avoiding the error in the data processing result and realizing the control of the voltage droop with load.

According to the embodiments of the disclosure, when the voltage droop with load is detected by adopting the CPM, the accuracy may be relatively high, and the minimum resolution is only limited by the minimum delay caused by the technology of the circuit. Therefore, the voltage droop with load may be detected finely. In addition, as an open-loop system, a detection value of the CPM may be updated in each sampling period, such that alarm signals for dynamic frequency modulation in the current sampling period when the voltage droop with load is detected may be output, thereby improving the response speed of the device.

It may be understood that, the implementations of the device described above are merely illustrative. The device of the disclosure may be implemented in other manners. For example, the division of the unit/module is only a logical function division and there may be other manners of division during actual implementations. For example, multiple units, modules, or components may be combined or may be integrated into another system, or some features may be ignored or not performed.

In addition, unless otherwise specified, the functional units/modules in various implementations of the disclosure may be integrated into one unit/module, or the units/modules may be physically present, or two or more units/modules may be integrated into one unit/module. The above-mentioned integrated unit/module may be implemented in the form of hardware or a software function unit.

If the integrated unit/module is implemented in the form of hardware, the hardware may be digital circuitry, analog circuitry, and the like. Physical implementation of the hardware structure includes but is not limited to transistors, memristors, and so on. Unless otherwise specified, the IPU may be any suitable hardware processor such as CPU, GPU, FPGA, DSP, ASIC, and the like. Unless otherwise specified, the storage unit may be any suitable magnetic storage medium or magneto-optical storage medium, for example, a resistive random access memory (RRAM), a dynamic RAM (DRAM), a static RAM (SRAM), an enhanced DRAM (EDRAM), a high-bandwidth memory (HBM), a hybrid memory cube (HMC), and the like.

The integrated unit/module may be stored in a computer-readable memory when it is implemented in the form of a software functional module and is sold or used as a separate product. Based on this understanding, the technical solutions of the disclosure are essentially or the part that contributes to the related art, or all or part of the technical solution may be embodied in the form of a software product. The computer software product is stored in a memory and includes instructions for causing a computer device (which may be a personal computer, server, network device, or the like) to perform all or part of the steps of the method described in various implementations of the disclosure. The memory includes a U disk, a read-only memory (ROM), a RAM, a removable hard disk, a magnetic disk, or an optical disk, and other media capable of storing program codes.

In a possible embodiment, an artificial intelligence chip is provided, which includes the device for clock control described above.

In a possible embodiment, a board card is provided, which includes a storage device, an interface device, a control device, and the artificial intelligence chip. The artificial intelligence chip is connected with the storage device, the control device, and the interface device, respectively. The storage device is configured to store data. The interface device is configured to realize data transmission between the artificial intelligence chip and an external device. The control device is configured to monitor a state of the artificial intelligence chip.

Figure 10:
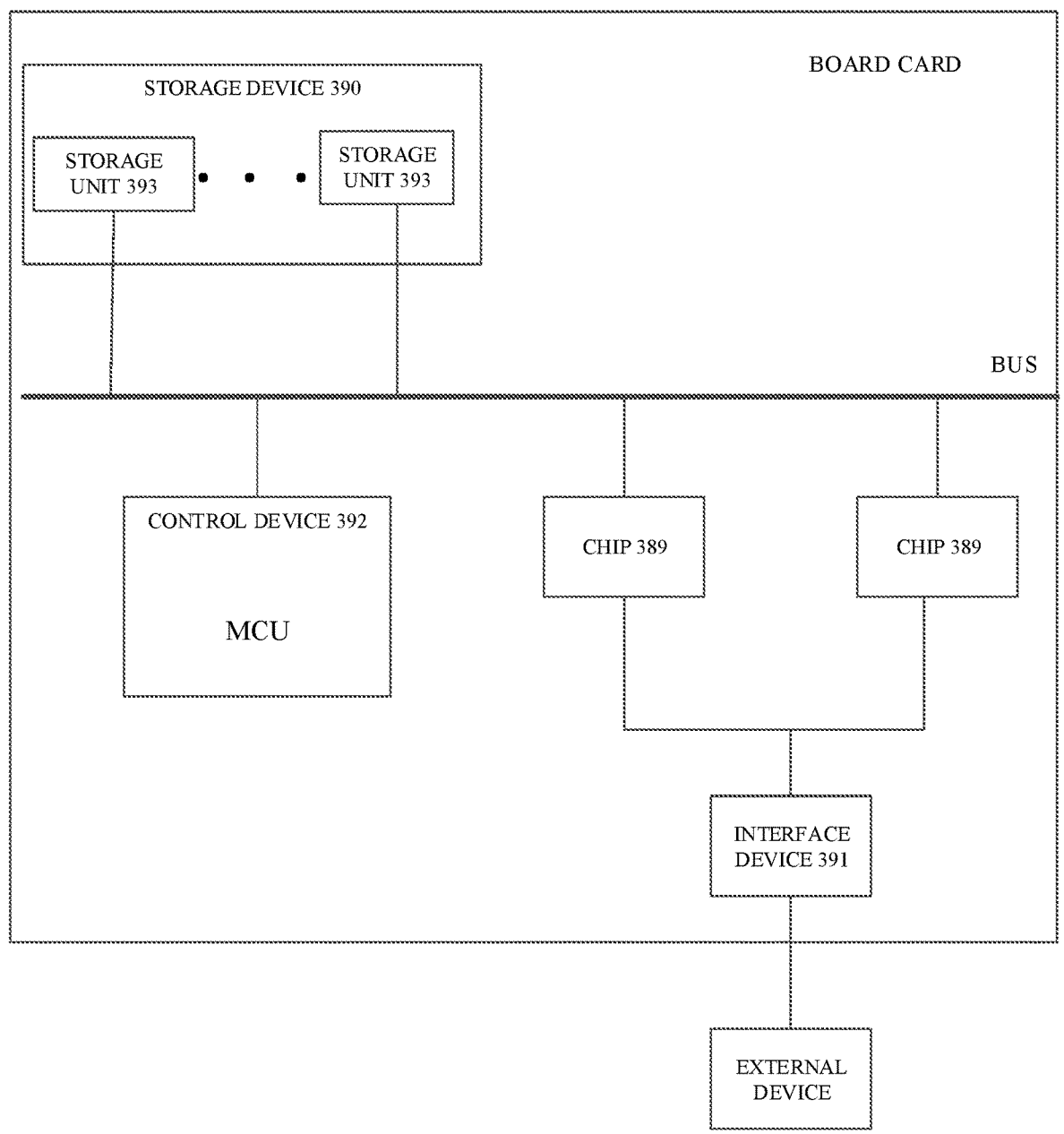
FIG. 10 is a structural block diagram illustrating a board card according to an embodiment of the disclosure.

FIG. 10 is a structural block diagram illustrating a board card according to an embodiment of the disclosure. As illustrated in FIG. 10, in addition to a chip 389, the board card may further include other support components. The other support components include but are not limited to: a storage device 390, an interface device 391, and a control device 392.

The memory device 390 is connected with the artificial intelligence chip via a bus and is configured to store data. The memory device may include a plurality of groups of storage units 393. Each group of the storage unit is connected with the artificial intelligence chip via the bus. It is understandable that each group of the storage unit may be a double data rate SDRAM (DDR SDRAM).

The DDR may increase a speed of SDRAM by multiple times without increasing a clock frequency, and allow data to be read at a rising edge and a falling edge of a clock pulse. The speed of DDR is twice as fast as that of standard SDRAM. In an example, the storage device may include four groups of the storage units. Each group of the storage unit may include multiple DDR4 particles (chips). In an example, the artificial intelligence chip may include four 72-bit DDR4 controllers. In the 72-bit DDDR4 controllers, 64-bit is used for data transmission and 8-bit is used for ECC verification. It is understandable that a theoretical bandwidth of data transmission may reach 25600 MB/s when DDR4-3200 particles are used in each group of the storage units.

In an example, each group of the storage units may include multiple DDR SDRAMs which are set in parallel. The DDR may transmit data twice in a clock cycle. A controller for controlling DDR is set in the chip for controlling data transmission and data storage of each storage unit.

The interface device is electrically connected with the artificial intelligence chip. The interface device is configured to realize data transmission between the artificial intelligence chip and an external device (such as a server or a computer). In an example, the interface device may be a standard PCIE interface. For example, data to be processed is transmitted to the chip by the server through the standard PCIE interface to realize data transmission. In another example, when a PCIE 3.0X 16 interface is used for transmission, the theoretical bandwidth may reach 16000 MB/s. In another example, the interface device may be other interfaces, and the disclosure is not intended to limit specific representations of the other interfaces, as long as the interface unit may realize transmission. In addition, a computation result of the artificial intelligence chip is still transmitted back to the external device (such as the server) by the interface device.

The control device is electrically connected with the artificial intelligence chip. The control device is configured to monitor the state of the artificial intelligence chip. For example, the artificial intelligence chip and the control device may be electrically connected through an SPI interface. The control device may include a microcontroller unit (MCU). The artificial intelligence chip may include multiple processing chips, multiple processing cores, or multiple processing circuits, which may drive multiple loads. Therefore, the artificial intelligence chip may work under different working states such as multi-load and light-load. The control device may be capable of regulating the working states of the multiple processing chips, the multiple processing chips, and the multiple processing circuits in the artificial intelligence chip.

Another example of the disclosure provides an electronic device, which includes the artificial intelligence chip. The electronic device includes a device for data processing, a robot, a computer, a printer, a scanner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device. The transportation means includes an airplane, a ship, and/or a vehicle. The household electrical appliance includes a television, an air conditioner, a microwave oven, a refrigerator, an electric rice cooker, a humidifier, a washing machine, an electric lamp, a gas cooker, and a range hood. The medical device includes a nuclear magnetic resonance spectrometer, a B-ultrasonic scanner, and/or an electrocardiograph.

In the foregoing implementations, the description of each implementation has its own emphasis. For the parts not described in detail in one implementation, reference may be made to related descriptions in other implementations. The technical features of the above-described implementations may be arbitrarily combined, and all possible combinations of the technical features of the above-described implementations have not been described to make the description concise. However, as long as there is no contradiction in the combinations of the technical features, they should be considered as the scope described in this specification.

The foregoing may be better understood according to following clauses.

A1. A device for clock control, being applied to a processor and comprising:

a voltage detecting unit configured to detect a supply voltage at a target position in the processor, and output a voltage-alarm signal when the supply voltage is lower than or equal to a preset first threshold; and a clock stretching unit connected with the voltage detecting unit and configured to, when receiving the voltage-alarm signal, generate a second clock signal according to a first clock signal corresponding to a reference frequency, therefore, the processor uses the second clock signal to perform data processing, wherein a frequency of the second clock signal is lower than the reference frequency.

A2. The device of A1, wherein the voltage detecting unit includes a first detecting unit, wherein the first detecting unit includes:

a pulse generation circuit configured to receive an input of a fifth clock signal and output a pulse signal, a delay circuit connected with the pulse generation circuit, and configured to receive an input of the pulse signal and output a delayed pulse signal, wherein a delay between the delayed pulse signal and the pulse signal is negatively correlated with the supply voltage at the target position, and a voltage detecting and processing circuit connected with the delay circuit, and configured to determine the supply voltage at the target position according to the delayed pulse signal and the fifth clock signal and output a first voltage-alarm signal when the supply voltage is lower than or equal to the first threshold.

A3. The device of A2, wherein the voltage detecting and processing circuit is further configured to:

during output of the first voltage-alarm signal, output a first voltage-normal signal when the supply voltage is higher than or equal to a preset second threshold and a duration for which the supply voltage is higher than or equal to the second threshold reaches a preset first duration, wherein the second threshold is greater than the first threshold.

A4. The device of A1, wherein the voltage detecting unit includes a second detecting unit, wherein the second detecting unit includes:

a ring oscillation circuit configured to output a fourth clock signal according to the supply voltage at the target position, and a processing circuit connected with the ring oscillation circuit, and configured to determine a count value within a preset second duration according to the fourth clock signal, and output a second voltage-alarm signal when the count value is less than or equal to a preset first count threshold.

A5. The device of A2 or A3, wherein the voltage detecting unit further includes a second detecting unit, wherein the second detecting unit includes:

a ring oscillation circuit configured to output a fourth clock signal according to the supply voltage at the target position, and a processing circuit connected with the ring oscillation circuit, and configured to determine a count value within a preset second duration according to the fourth clock signal and output a second voltage-alarm signal when the count value is less than or equal to a preset first count threshold.

A6. The device of A5, wherein the processing circuit is further configured to:

during output of the second voltage-alarm signal, output a second voltage-normal signal when the count value is greater than or equal to a preset second count threshold and the number of times that the count value is greater than or equal to the second count threshold reaches a preset number of times, wherein the second count threshold is greater than the first count threshold.

A7. The device of A5 or A6, wherein the voltage detecting unit further includes a first selecting unit connected with the first detecting unit, the second detecting unit, and the clock stretching unit, wherein the first selecting unit is configured to:
output an output signal of the first detecting unit or an output signal of the second detecting unit to the clock stretching unit.

A8. The device of A6, wherein the voltage detecting unit further includes a second selecting unit connected with the first detecting unit, the second detecting unit, and the clock stretching unit, wherein the second selecting unit is configured to:
output the voltage-alarm signal to the clock stretching unit when the first detecting unit outputs the first voltage-alarm signal and/or the second detecting unit outputs the second voltage-alarm signal, and
output a voltage-normal signal to the clock stretching unit when the first detecting unit outputs a first voltage-normal signal and the second detecting unit outputs the second voltage-normal signal.

A9. The device of any of A1 to A8, wherein the clock stretching unit includes:
a clock phase generation circuit configured to output a plurality of phase clock signals according to the first clock signal, and
a clock stretching circuit connected with the clock phase generation circuit, and configured to generate the second clock signal through an integrated clock gating according to the plurality of phase clock signals in response to reception of the voltage-alarm signal.

A10. The device of A9, wherein the clock stretching unit is further configured to:
generate a third clock signal according to the first clock signal or the plurality of phase clock signals in response to reception of a voltage-normal signal, such that the processor uses the third clock signal to perform data processing, wherein a frequency of the third clock signal is equal to the reference frequency.

A11. An artificial intelligence chip, wherein the chip comprises the device for clock control of any of A1 to A10.

A12. An electronic device, wherein the electronic device comprises the artificial intelligence chip of A11.

A13. Aboard card, wherein the board card comprises:
a storage device;
an interface device;
a control device; and
the artificial intelligence chip of claim 11, wherein
the artificial intelligence chip is connected with the storage device, the control device, and the interface device, respectively;
the storage device is configured to store data;
the interface device is configured to realize data transmission between the artificial intelligence chip and an external device; and
the control device is configured to monitor a state of the artificial intelligence chip.

The implementations of the disclosure are described in detail herein, and specific examples are described herein to illustrate the principles and implementations of the disclosure, and the above implementations are intended to help understand the methods of the disclosure and their core ideas. According to the idea of the disclosure, the changes or deformations made by those skilled in the art based on the specific implementations and application scope of the disclosure belong to the protection scope of the disclosure. In summary, the contents of the specification should not be construed as limiting the disclosure.

What is claimed is:

1. A device for clock control, being applied to a processor and comprising:
    a voltage detecting unit configured to detect a supply voltage at a target position in the processor, and output a voltage-alarm signal when the supply voltage is lower than or equal to a preset first threshold; and
    a clock stretching unit connected with the voltage detecting unit and configured to generate a second clock signal according to a first clock signal having a reference frequency in response to reception of the voltage-alarm signal, such that the processor uses the second clock signal to perform data processing, wherein
    a frequency of the second clock signal is lower than the reference frequency,
    wherein the voltage detecting unit includes a first detecting unit, wherein the first detecting unit includes:
    a pulse generation circuit configured to receive an input of a fifth clock signal and output a pulse signal,
    a delay circuit connected with the pulse generation circuit, and configured to receive an input of the pulse signal and output a delayed pulse signal, wherein a delay between the delayed pulse signal and the pulse signal is negatively correlated with the supply voltage at the target position, and
    a voltage detecting and processing circuit connected with the delay circuit, and configured to determine the supply voltage at the target position according to the delayed pulse signal and the fifth clock signal and output a first voltage-alarm signal when the supply voltage is lower than or equal to the first threshold.

2. The device of claim 1, wherein the voltage detecting and processing circuit is further configured to:
    during output of the first voltage-alarm signal, output a first voltage-normal signal when the supply voltage is higher than or equal to a preset second threshold and a duration for which the supply voltage is higher than or equal to the second threshold reaches a preset first duration, wherein
    the second threshold is greater than the first threshold.

3. The device of claim 1, wherein the voltage detecting unit includes a second detecting unit, wherein the second detecting unit includes:
    a ring oscillation circuit configured to output a fourth clock signal according to the supply voltage at the target position, and
    a processing circuit connected with the ring oscillation circuit, and configured to determine a count value within a preset second duration according to the fourth clock signal, and output a second voltage-alarm signal when the count value is less than or equal to a preset first count threshold.

4. The device of claim 1, wherein the voltage detecting unit further includes a second detecting unit, wherein the second detecting unit includes:
    a ring oscillation circuit configured to output a fourth clock signal according to the supply voltage at the target position, and
    a processing circuit connected with the ring oscillation circuit, and configured to determine a count value within a preset second duration according to the fourth clock signal and output a second voltage-alarm signal when the count value is less than or equal to a preset first count threshold.

5. The device of claim 4, wherein the processing circuit is further configured to:

during output of the second voltage-alarm signal, output a second voltage-normal signal when the count value is greater than or equal to a preset second count threshold and the number of times that the count value is greater than or equal to the second count threshold reaches a preset number of times, wherein the second count threshold is greater than the first count threshold.

6. The device of claim 4, wherein the voltage detecting unit further includes a first selecting unit connected with the first detecting unit, the second detecting unit, and the clock stretching unit, wherein the first selecting unit is configured to:

output an output signal of the first detecting unit or an output signal of the second detecting unit to the clock stretching unit.

7. The device of claim 5, wherein the voltage detecting unit further includes a second selecting unit connected with the first detecting unit, the second detecting unit, and the clock stretching unit, wherein the second selecting unit is configured to:

output the voltage-alarm signal to the clock stretching unit when the first detecting unit outputs the first voltage-alarm signal and/or the second detecting unit outputs the second voltage-alarm signal, and output a voltage-normal signal to the clock stretching unit when the first detecting unit outputs a first voltage-normal signal and the second detecting unit outputs the second voltage-normal signal.

8. The device of claim 1, wherein the clock stretching unit includes:

a clock phase generation circuit configured to output a plurality of phase clock signals according to the first clock signal, and a clock stretching circuit connected with the clock phase generation circuit, and configured to generate the second clock signal through an integrated clock gating according to the plurality of phase clock signals in response to reception of the voltage-alarm signal.

9. The device of claim 8, wherein the clock stretching unit is further configured to:

generate a third clock signal according to the first clock signal or the plurality of phase clock signals in response to reception of a voltage-normal signal, such that the processor uses the third clock signal to perform data processing, wherein a frequency of the third clock signal is equal to the reference frequency.

10. An artificial intelligence chip that includes a device for clock control, comprising:

a voltage detecting unit configured to detect a supply voltage at a target position in the processor, and output a voltage-alarm signal when the supply voltage is lower than or equal to a preset first threshold; and a clock stretching unit connected with the voltage detecting unit and configured to generate a second clock signal according to a first clock signal having a reference frequency in response to reception of the voltage-alarm signal, such that the processor uses the second clock signal to perform data processing, wherein a frequency of the second clock signal is lower than the reference frequency, wherein the voltage detecting unit includes a first detecting unit, wherein the first detecting unit includes:

a pulse generation circuit configured to receive an input of a fifth clock signal and output a pulse signal, a delay circuit connected with the pulse generation circuit, and configured to receive an input of the pulse signal and output a delayed pulse signal, wherein a delay between the delayed pulse signal and the pulse signal is negatively correlated with the supply voltage at the target position, and a voltage detecting and processing circuit connected with the delay circuit, and configured to determine the supply voltage at the target position according to the delayed pulse signal and the fifth clock signal and output a first voltage-alarm signal when the supply voltage is lower than or equal to the first threshold.

11. An electronic device, wherein the electronic device comprises an artificial intelligence chip that includes a device for clock control, comprising:

a voltage detecting unit configured to detect a supply voltage at a target position in the processor, and output a voltage-alarm signal when the supply voltage is lower than or equal to a preset first threshold; and a clock stretching unit connected with the voltage detecting unit and configured to generate a second clock signal according to a first clock signal having a reference frequency in response to reception of the voltage-alarm signal, such that the processor uses the second clock signal to perform data processing, wherein a frequency of the second clock signal is lower than the reference frequency, wherein the voltage detecting unit includes a first detecting unit, wherein the first detecting unit includes:

a pulse generation circuit configured to receive an input of a fifth clock signal and output a pulse signal, a delay circuit connected with the pulse generation circuit, and configured to receive an input of the pulse signal and output a delayed pulse signal, wherein a delay between the delayed pulse signal and the pulse signal is negatively correlated with the supply voltage at the target position, and a voltage detecting and processing circuit connected with the delay circuit, and configured to determine the supply voltage at the target position according to the delayed pulse signal and the fifth clock signal and output a first voltage-alarm signal when the supply voltage is lower than or equal to the first threshold.

12. The electronic device of claim 11, wherein the electronic device is a board card that further includes:

a storage device;

an interface device;

a control device, wherein the artificial intelligence chip is connected with the storage device, the control device, and the interface device, respectively;

the storage device is configured to store data;

the interface device is configured to realize data transmission between the artificial intelligence chip and an external device; and the control device is configured to monitor a state of the artificial intelligence chip.

13. A device for clock control, being applied to a processor and comprising:

a voltage detecting unit configured to detect a supply voltage at a target position in the processor, and output a voltage-alarm signal when the supply voltage is lower than or equal to a preset first threshold; and a clock stretching unit connected with the voltage detecting unit and configured to generate a second clock signal according to a first clock signal having a reference frequency in response to reception of the voltage-alarm signal, such that the processor uses the second clock signal to perform data processing, wherein a frequency of the second clock signal is lower than the reference frequency, wherein the clock stretching unit includes:
  a clock phase generation circuit configured to output a plurality of phase clock signals according to the first clock signal, and
  a clock stretching circuit connected with the clock phase generation circuit, and configured to generate the second clock signal through an integrated clock gating according to the plurality of phase clock signals in response to reception of the voltage-alarm signal.

14. The device of claim 13, wherein the voltage detecting unit includes a first detecting unit, wherein the first detecting unit includes:
  a pulse generation circuit configured to receive an input of a fifth clock signal and output a pulse signal,
  a delay circuit connected with the pulse generation circuit, and configured to receive an input of the pulse signal and output a delayed pulse signal, wherein a delay between the delayed pulse signal and the pulse signal is negatively correlated with the supply voltage at the target position, and
  a voltage detecting and processing circuit connected with the delay circuit, and configured to determine the supply voltage at the target position according to the delayed pulse signal and the fifth clock signal and output a first voltage-alarm signal when the supply voltage is lower than or equal to the first threshold,
  wherein the voltage detecting and processing circuit is further configured to:
    during output of the first voltage-alarm signal, output a first voltage-normal signal when the supply voltage is higher than or equal to a preset second threshold and a duration for which the supply voltage is higher than or equal to the second threshold reaches a preset first duration, wherein
    the second threshold is greater than the first threshold.

15. The device of claim 13, wherein the voltage detecting unit includes a first detecting unit, wherein the first detecting unit includes:
  a pulse generation circuit configured to receive an input of a fifth clock signal and output a pulse signal,
  a delay circuit connected with the pulse generation circuit, and configured to receive an input of the pulse signal and output a delayed pulse signal, wherein a delay between the delayed pulse signal and the pulse signal is negatively correlated with the supply voltage at the target position, and
  a voltage detecting and processing circuit connected with the delay circuit, and configured to determine the supply voltage at the target position according to the delayed pulse signal and the fifth clock signal and output a first voltage-alarm signal when the supply voltage is lower than or equal to the first threshold, wherein the voltage detecting unit further includes a second detecting unit, wherein the second detecting unit includes:
  a ring oscillation circuit configured to output a fourth clock signal according to the supply voltage at the target position, and
  a processing circuit connected with the ring oscillation circuit, and configured to determine a count value within a preset second duration according to the fourth clock signal and output a second voltage-alarm signal when the count value is less than or equal to a preset first count threshold.

16. The device of claim 15, wherein the processing circuit is further configured to:
  during output of the second voltage-alarm signal, output a second voltage-normal signal when the count value is greater than or equal to a preset second count threshold and the number of times that the count value is greater than or equal to the second count threshold reaches a preset number of times, wherein
  the second count threshold is greater than the first count threshold.

17. The device of claim 15, wherein the voltage detecting unit further includes a first selecting unit connected with the first detecting unit, the second detecting unit, and the clock stretching unit, wherein the first selecting unit is configured to:
  output an output signal of the first detecting unit or an output signal of the second detecting unit to the clock stretching unit.

18. The device of claim 16, wherein the voltage detecting unit further includes a second selecting unit connected with the first detecting unit, the second detecting unit, and the clock stretching unit, wherein the second selecting unit is configured to:
  output the voltage-alarm signal to the clock stretching unit when the first detecting unit outputs the first voltage-alarm signal and/or the second detecting unit outputs the second voltage-alarm signal, and
  output a voltage-normal signal to the clock stretching unit when the first detecting unit outputs a first voltage-normal signal and the second detecting unit outputs the second voltage-normal signal.

19. The device of claim 13, wherein the clock stretching unit is further configured to:
  generate a third clock signal according to the first clock signal or the plurality of phase clock signals in response to reception of a voltage-normal signal, such that the processor uses the third clock signal to perform data processing, wherein a frequency of the third clock signal is equal to the reference frequency.

* * * * *